US009664238B2

(12) United States Patent
Gwin

(10) Patent No.: US 9,664,238 B2
(45) Date of Patent: May 30, 2017

(54) BIMETAL ACTIVATED VISCOUS CLUTCH WITH WIPER ON CLUTCH DISK

(71) Applicant: BorgWarner Inc., Auburn Hills, MI (US)

(72) Inventor: Darin Lee Gwin, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 25 days.

(21) Appl. No.: 14/517,896

(22) Filed: Oct. 19, 2014

(65) Prior Publication Data

US 2016/0108974 A1    Apr. 21, 2016

(51) Int. Cl.
*F16D 35/02*    (2006.01)

(52) U.S. Cl.
CPC ......... *F16D 35/022* (2013.01); *F16D 35/021* (2013.01); *F16D 35/023* (2013.01)

(58) Field of Classification Search
CPC ...... F16D 35/02; F16D 35/021; F16D 35/022; F16D 35/023; F16D 35/026
USPC ....................................................... 192/58.7
See application file for complete search history.

(56) References Cited

U.S. PATENT DOCUMENTS

| | | | |
|---|---|---|---|
| 4,046,239 A * | 9/1977 | Tinholt | F16D 35/021 192/58.5 |
| 4,056,178 A | 11/1977 | Detty | |
| 4,064,980 A | 12/1977 | Tinholt | |
| 4,190,140 A | 2/1980 | Konkle et al. | |
| RE30,428 E | 11/1980 | Detty | |
| 4,346,797 A | 8/1982 | Bopp | |
| 4,487,551 A | 12/1984 | Mizutani et al. | |
| 4,633,988 A | 1/1987 | Light | |
| 4,678,070 A | 7/1987 | Light | |
| 4,702,360 A | 10/1987 | Tanaka | |
| 4,828,088 A | 5/1989 | Mohan et al. | |
| 4,850,465 A * | 7/1989 | Ono | F16D 35/026 192/58.682 |
| 4,898,266 A | 2/1990 | Garrett et al. | |
| 4,898,267 A | 2/1990 | Garrett et al. | |
| 4,949,825 A | 8/1990 | Light | |
| 4,958,709 A | 9/1990 | Kennedy | |
| 4,974,712 A | 12/1990 | Brown | |
| 5,511,643 A | 4/1996 | Brown | |
| 5,893,442 A | 4/1999 | Light | |
| 5,996,755 A | 12/1999 | Burke | |
| 6,021,747 A * | 2/2000 | Gee | F16D 35/024 123/41.11 |
| 6,026,943 A * | 2/2000 | Fuchs | F16D 35/021 192/58.61 |
| 6,032,775 A * | 3/2000 | Martin | F16D 35/021 192/113.21 |

(Continued)

FOREIGN PATENT DOCUMENTS

DE     102012216337 A1    3/2013
WO    WO-2014/047430 A1    3/2014

*Primary Examiner* — Richard Lorence
(74) *Attorney, Agent, or Firm* — Harness, Dickey & Pierce, P.L.C.; John A. Artz PC

(57) ABSTRACT

Viscous fan drive systems with wiper members positioned on the OD of the clutch disks, and which rotate at high speed. The fluid reservoir also rotates at input speed. The wiper member directs viscous fluid radially back to the fluid reservoir. The valves in the viscous fan drive systems can be activated by a bimetal mechanism.

24 Claims, 7 Drawing Sheets

(56) References Cited

U.S. PATENT DOCUMENTS

| | | | |
|---|---|---|---|
| 6,125,981 A * | 10/2000 | Ito | F16D 35/026 192/58.61 |
| 6,206,639 B1 | 3/2001 | Light et al. | |
| 6,358,010 B2 | 3/2002 | Light et al. | |
| 6,530,748 B2 | 3/2003 | Light et al. | |
| 6,732,845 B2 | 5/2004 | Tilly et al. | |
| 6,752,251 B2 | 6/2004 | May et al. | |
| 6,868,809 B1 | 3/2005 | Robb | |
| 6,894,883 B2 | 5/2005 | Buchholz | |
| 7,159,702 B2 | 1/2007 | Tilly | |
| 7,293,636 B2 | 11/2007 | May | |
| 7,621,386 B2 | 11/2009 | Light | |
| 7,650,974 B2 | 1/2010 | Light et al. | |
| 7,963,380 B2 | 6/2011 | Light et al. | |
| 8,596,438 B2 | 12/2013 | Boyer | |
| 8,602,190 B2 | 12/2013 | May | |
| 9,316,272 B1 * | 4/2016 | Gwin | F16D 35/021 |
| 2004/0084273 A1 | 5/2004 | May et al. | |
| 2005/0045443 A1 | 3/2005 | Tilly | |
| 2005/0263365 A1 | 12/2005 | Barnum et al. | |
| 2006/0021843 A1 | 2/2006 | Saunders | |
| 2006/0042902 A1 | 3/2006 | Boyer | |
| 2006/0243553 A1 | 11/2006 | Light et al. | |
| 2006/0243554 A1 | 11/2006 | May | |
| 2006/0243817 A1 * | 11/2006 | Light | F24J 3/003 237/12.3 R |
| 2007/0119677 A1 | 5/2007 | Barnum et al. | |
| 2008/0023288 A1 | 1/2008 | Boyer | |
| 2008/0023289 A1 | 1/2008 | Boyer | |
| 2010/0059325 A1 | 3/2010 | Boyer | |
| 2010/0122885 A1 | 5/2010 | Light et al. | |
| 2011/0168512 A1 | 7/2011 | May | |
| 2011/0209676 A1 | 9/2011 | Malott, Jr. et al. | |
| 2011/0220452 A1 | 9/2011 | Roby, Jr. | |
| 2011/0266111 A1 | 11/2011 | Boyer | |
| 2012/0090949 A1 | 4/2012 | Rothoff et al. | |
| 2012/0107145 A1 | 5/2012 | Roby | |
| 2012/0138409 A1 | 6/2012 | Buchholz et al. | |
| 2013/0134008 A1 | 5/2013 | Boyer | |
| 2013/0299300 A1 | 11/2013 | Pickelman, Jr. et al. | |
| 2015/0184702 A1 | 7/2015 | Schmidt et al. | |
| 2016/0108974 A1 | 4/2016 | Gwin | |
| 2016/0108975 A1 * | 4/2016 | Gwin | F16D 35/024 192/58.7 |
| 2016/0123409 A1 | 5/2016 | Light et al. | |
| 2016/0123410 A1 | 5/2016 | Light et al. | |

* cited by examiner

BIMETAL ACTIVATED VISCOUS CLUTCH WITH WIPER ON CLUTCH DISK

CROSS-REFERENCE TO RELATED APPLICATIONS

This application is related to U.S. patent application Ser. No. 14/517,893, now U.S. Pat. No. 9,316,272 entitled Viscous Clutch With High-Speed Wiper System, and U.S. patent application Ser. No. 14/517,906 entitled Viscous Clutch Drive With Electromagnetic Activation and Wiper on Clutch Disk, both filed on the same day as the present application.

TECHNICAL FIELD

The present invention relates to viscous clutch fan drive systems, and more particularly to wiper members and scavenge systems for such drive systems.

BACKGROUND

The present invention relates to fluid-coupling devices of the type including both a fluid working chamber and a fluid reservoir chamber, and especially to providing an improved and more efficient pumping mechanism for removing fluid from the operating chamber.

Although the present invention may be used advantageously in fluid-coupling devices having various configurations and applications, it is especially advantageous in a coupling device of the type used to drive a radiator cooling fan for an internal combustion engine, and will be described in connection therewith.

Fluid-coupling devices ("fan drives") of the viscous shear type have been popular for many years for driving engine cooling fans, primarily because their use results in substantial saving of engine horsepower. Typical fluid-coupling devices operate in the engaged, relatively higher speed condition only when cooling is needed, and operate in a disengaged, relatively lower speed condition when little or no cooling is required. These devices typically use wipers to control the amount of viscous fluid exiting the working chamber to control the relative engagement of the fan drive at a given input speed. Fan drives controlled by valve metering systems, such as electromagnetic controlled valve systems or bimetal controlled valve systems, achieve a very low disengaged fan speed by removing nearly all the viscous fluid from the fan drive labyrinth, or working chamber, during disengaged operations. This is desirable in that it minimizes parasitic power losses in the vehicle while improving fuel economy.

Conventional wiper systems include separate devices, preferably made of a plastic material, that are positioned between the clutch disk members and the housings. The wiper members are positioned on, or attached to, the inside surface of the housings and operate to pump viscous fluid into a scavenge passageway from the working chamber. The scavenge passageway typically comprises passageways which are machined into the housings.

It is an object of the present invention to provide unique wiper members and scavenge systems for viscous clutches which are improvements over known wiper members and scavenge systems. It also is an object to provide improved viscous clutch mechanisms with such unique wiper members and scavenge systems, and which also may utilize a high-speed reservoir.

SUMMARY OF THE INVENTION

The present invention provides an improved wiper member and scavenge system for a viscous clutch fan drive, particularly a fan drive with a high speed reservoir. The present invention also provides improved viscous fan drive systems which incorporate an improved wiper member and scavenge system.

In accordance with an embodiment of the invention, the fan drive mechanism includes a housing which typically comprises a body member and a cover member. A fan member attached to the outer housing rotates with it. The housing includes one-half of a labyrinth fluid working chamber and is rotatably positioned by one or more bearing members onto a shaft member.

The shaft member is connected to a pulley member and rotates at input speed inside the housing member. A clutch disk member with the second one-half of the labyrinth fluid working chamber is attached to the shaft member and rotates with it. A fluid reservoir cover is attached to the clutch disk member and also rotates with it at input speed along with the viscous fluid in the reservoir.

A wiper member is positioned on the external peripheral surface of the clutch disk member, preferably in the radial clearance space between the clutch disk member and the housing. The wiper member is a raised area preferably formed integrally on the outer circumferential surface of the clutch disk member. An opening is also located on the outer circumferential surface, adjacent the wiper member, and opens into a scavenge passageway in the clutch disk member. The scavenge passageway is a substantially radially oriented channel and returns scavenge viscous fluid directly to the fluid reservoir chamber.

A moveable valve member is also located in the fluid reservoir and operates to selectively allow viscous fluid to pass from the fluid reservoir chamber to the working chamber. The valve member can be operated by an electromagnetic mechanism or a bimetal mechanism, as desired in different embodiments. The valve member is positioned and attached in a manner to rotate with the shaft and clutch disk member.

The improved wiper member, as well as the improved viscous fan drive have benefits and advantages over known wiper members and known viscous fan drives, and are particularly beneficial for use with trucks and other large vehicles. The high speed fluid reservoir increases the engagement response of the fan drive, which is particularly important at low fan speeds. Also, reducing the fan speed when cooling is not needed results in lower parasitic losses and improved fuel economy.

Other embodiments and features of the invention, together with additional benefits and advantages, will be provided below, in combination with the attached drawings and appended claims.

DESCRIPTION OF THE PREFERRED EMBODIMENTS

Figure 1:
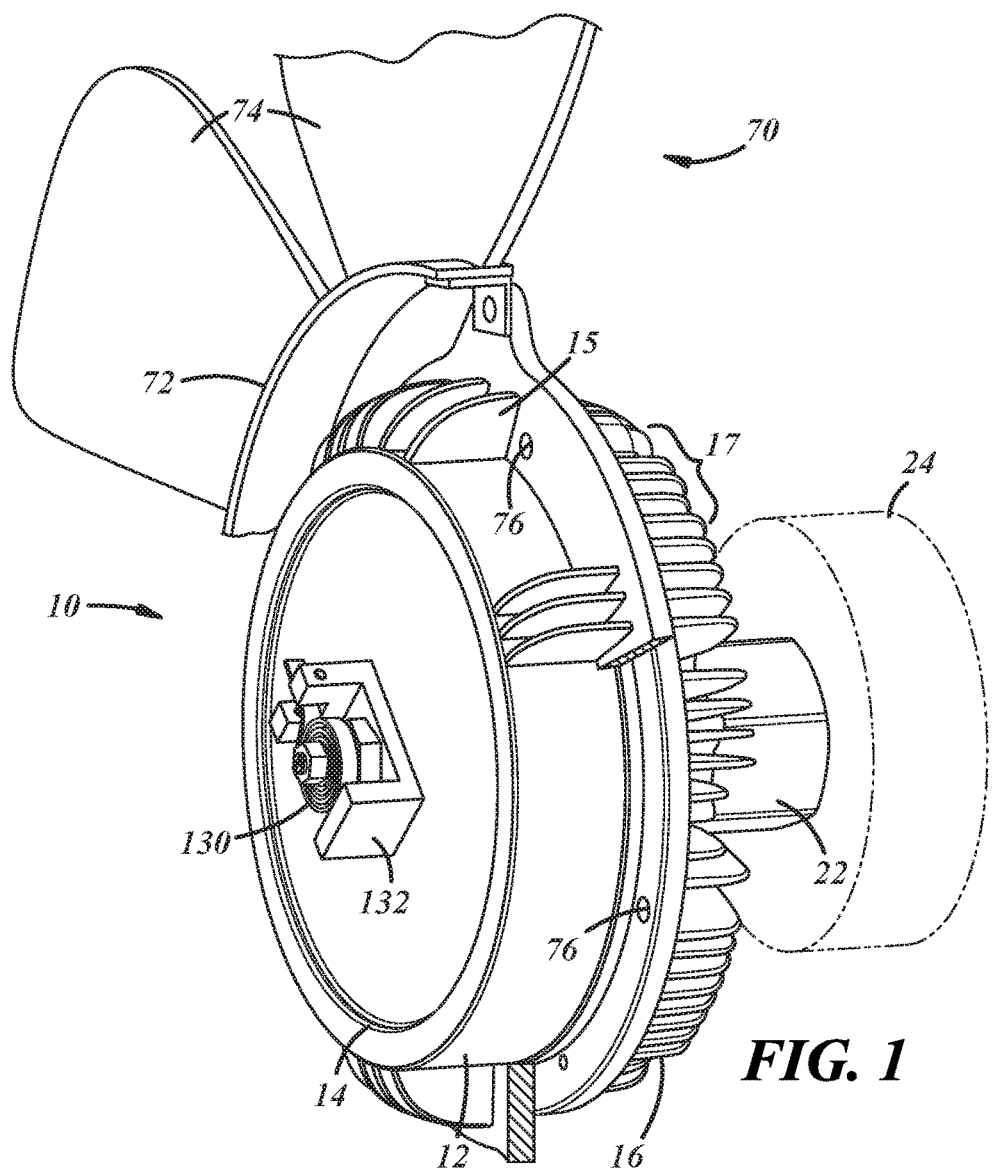
FIG. 1 is a perspective view of a viscous fluid drive according to one embodiment of the invention.

The invention will be described herein relative to a fan drive 10 for use in cooling engines of vehicles with internal combustion engines. However, it is to be understood that the invention and embodiments thereof can be utilized with most viscous fluid fan drives for various engines. For example, the fan drives can have valve mechanisms which are operated by bimetal mechanisms or electromagnetic mechanisms, or any other form of valve actuating mechanisms. In addition, the fan drive can have a clutch disk and fluid reservoir which rotate either at input speed or at the speed of the engaged fan.

Regardless of the fan drive and regardless of the speed of rotation of the clutch disk and fluid reservoir, the embodiments of the invention utilize a unique fluid wiping/pumping system with a unique wiper member, as discussed below.

For purposes of describing the invention herein, the fan drive embodiments have a valve mechanism which is either operated by a bimetal controlled operation system, or an electromagnetically controlled operation system, and where the clutch disk and fluid reservoir are rotated at input speed. The "input speed" is typically the speed of rotation of the vehicle engine either directly, or through a transmission or pulley system. The rotation of the fluid reservoir and wiper member at input speed are also known as a "high-speed reservoir" and a "high-speed wiper". As indicated above, these embodiments are meant to be exemplary of systems which can utilize the invention, and are not meant to be limited. For example, the viscous drive system described herein can be utilized with engine accessory systems other than fan drive systems, such as systems which drive alternators, air compressors, and the like.

As shown in FIGS. 1-6 in the drawings, the fan drive 10 includes a housing 12 which includes a cover member 14 and a body member 16. The cover member 14 typically has a plurality of cooling fins 15 positioned on its outer surface, only a portion of which are shown in the drawings. Similarly, the body member 16 has a plurality of cooling fins 17 positioned on its outer surface.

A clutch disk member 20 is positioned in the interior of the housing and is fixedly connected to shaft member 22. The shaft member is connected to a pulley member 24 which is driven by an engine belt (not shown) at input speed. Thus, in this embodiment, the pulley member 24, shaft member 22 and clutch disk 20 all rotate at input speed.

The housing member 12, which consists of the body member and cover member fixedly attached together, is positioned rotatably on shaft member 22 by bearing member 26. A fan member 70 comprising a hub member 72 and a plurality of fan blade members 74 are positioned on the housing member 12. The fan member can be attached to the housing in any conventional manner, such as by fasteners 75 positioned in openings 76. In addition, the blade members 74 utilized on the fan member 70 can be any size, shape and number as desired for the function of the fan drive and the cooling needed for the engine. The housing member and fan member rotate when a cooling air stream is needed.

A fluid reservoir cover member 30 is also attached or connected to the clutch disk member 20 and rotates with it. The fluid chamber 32 in the reservoir cover member 30 constitutes the fluid reservoir. The cover member 30 can be attached to the clutch disk member 20 in any conventional manner, such as by cold rolling an annular ridge member (not shown) formed on the clutch disk member. Viscous fluid (not shown) in the fluid reservoir 32 rotates at the same high speed as the clutch disk. This assists in transferring viscous fluid to the working chamber 50 of the viscous fan drive in an earlier and faster manner, particularly when the vehicle is started up and/or when the cooling fan is initially started or is needed to be put into operation.

The clutch disk member 20 is positioned in a circular groove or channel 40 formed in the housing 12. The channel 40 can be formed in either the cover member 14 (as shown), or the body member 16, or partially in each member at the intersection of the two members.

The clutch disk 20 has a central area 34 in which the reservoir cover 30 is positioned. The clutch disk also has a central opening 36 for attachment to the central shaft member 22. The clutch disk can be securely mated or attached to the shaft member in any conventional manner, such as being force fit thereon, by using a key member (not shown), etc.

The working chamber 50 of the fan drive is where the viscous fluid is utilized to cause the housing member 12 and fan member 70 to rotate and assist in cooling the engine. The working chamber 50 includes a labyrinth of interleaving concentric channels for the viscous fluid. The clutch disk 20 has a series of labyrinth channels 52 which intermesh with a series of labyrinth channels 54 in the housing 12. Preferably, as shown, there are two labyrinths on the outer annular area of the clutch disk, one on each side of the clutch disk, as well as a pair of matching labyrinths in the housing 12. This increases the response time and assists in the accurate control of the desired speed of the cooling fan. It is also understood that only one pair of interleaving labyrinths could be utilized, one set on the clutch disk and a matching set on the housing.

It is also possible, as known in the art, to utilize a working chamber that has other configurations of ridges and grooves, or has smooth surfaces.

When it is desired to rotate the fan member 70, viscous fluid is allowed to flow into the working chamber where it fills the mating labyrinth channels, such as channels 52 and 54. This causes the housing and fan to rotate due to the constant rotation of the clutch disk member. The amount of viscous fluid in the working chamber controls the speed of rotation of the fan.

The clutch disk member 20 is preferably made of an aluminum material. The housing members, such as the cover member and body member, as well as the shaft member, are similarly preferably made of an aluminum material.

A wiper member 60 is positioned on the outer circumferential surface 21 of the clutch disk member 20. The wiper member is positioned in the radial clearance space 25 between the clutch disk member 20 and the housing 12.

Figure 4:
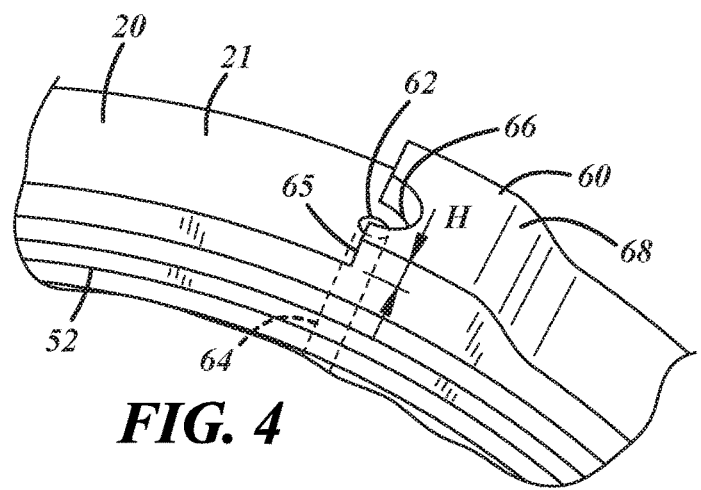
FIG. 4 is an enlarged view of the wiper member integrally formed and located on a clutch disk member in accordance with one embodiment of the present invention.
Figure 3:
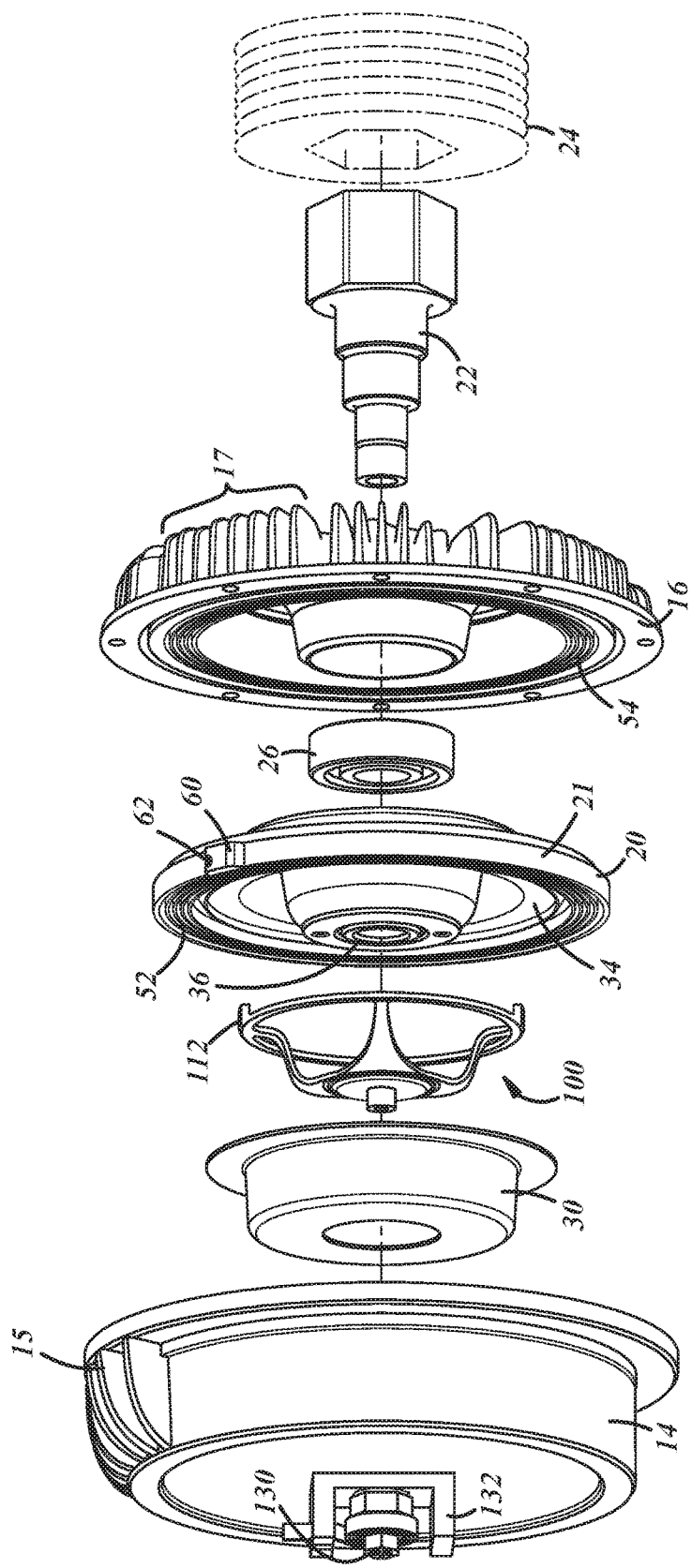
FIG. 3 is an exploded view of the fan drive components of FIGS. 1 and 2.
Figure 5:
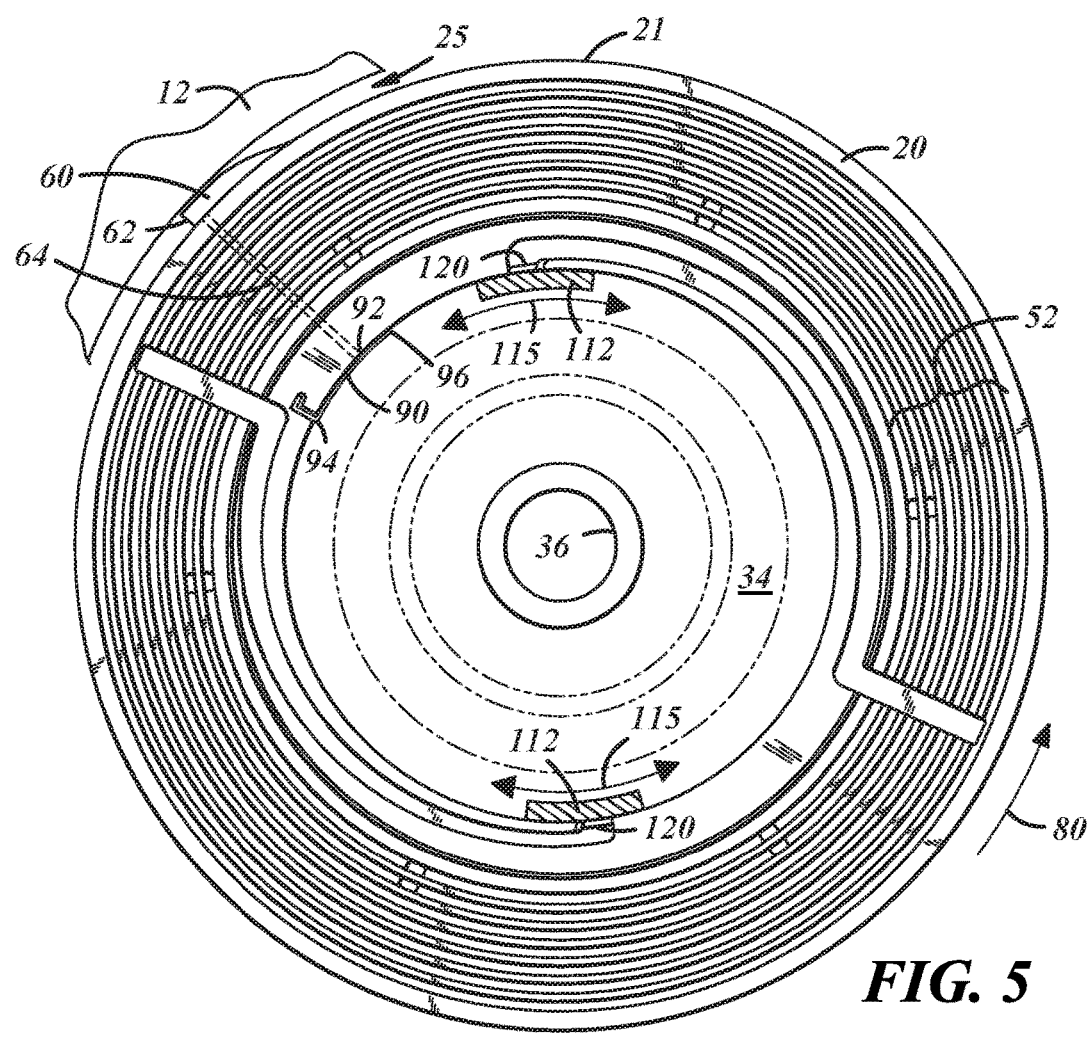
FIGS. 5 and 6 are plan views of a clutch disk member for use in the fan drive embodiment of FIGS. 1-3.

The wiper member is used to direct viscous fluid exiting the working chamber 50 back into the fluid reservoir 32. For this purpose, a scavenge opening 62 is provided in the clutch disk, as shown in FIGS. 3-5. The opening leads to a scavenge passageway 64 which opens radially into the central area 34 of the clutch disk, and thus into the fluid reservoir 32. Positioning the scavenge channel or passageway in the clutch disk in this manner is more efficient and eliminates machining and drilling procedures.

Unlike known wiper members, the wiper member 60 is formed directly on the outer circumferential surface 21 of the clutch disk member 20 and thus rotates with the clutch disk at input speed. The wiper member 60 preferably is formed integrally with the clutch disk member. The wiper member could be originally formed or molded as part of the clutch disk member when it is made, or the wiper member could be made separately and then welded or otherwise integrally attached to the clutch disk member.

Preferably, as an embodiment, as shown particularly in FIG. 4, the wiper member 60 is formed with a front face 65 which has a recess 66 in which the scavenge opening 62 is positioned. The wiper member also preferably has a height H of about 0.100 to 0.500 inches. The wiper member 60 also has a ramp or angled surface 68 at the end opposite the front face 65.

Figure 6:
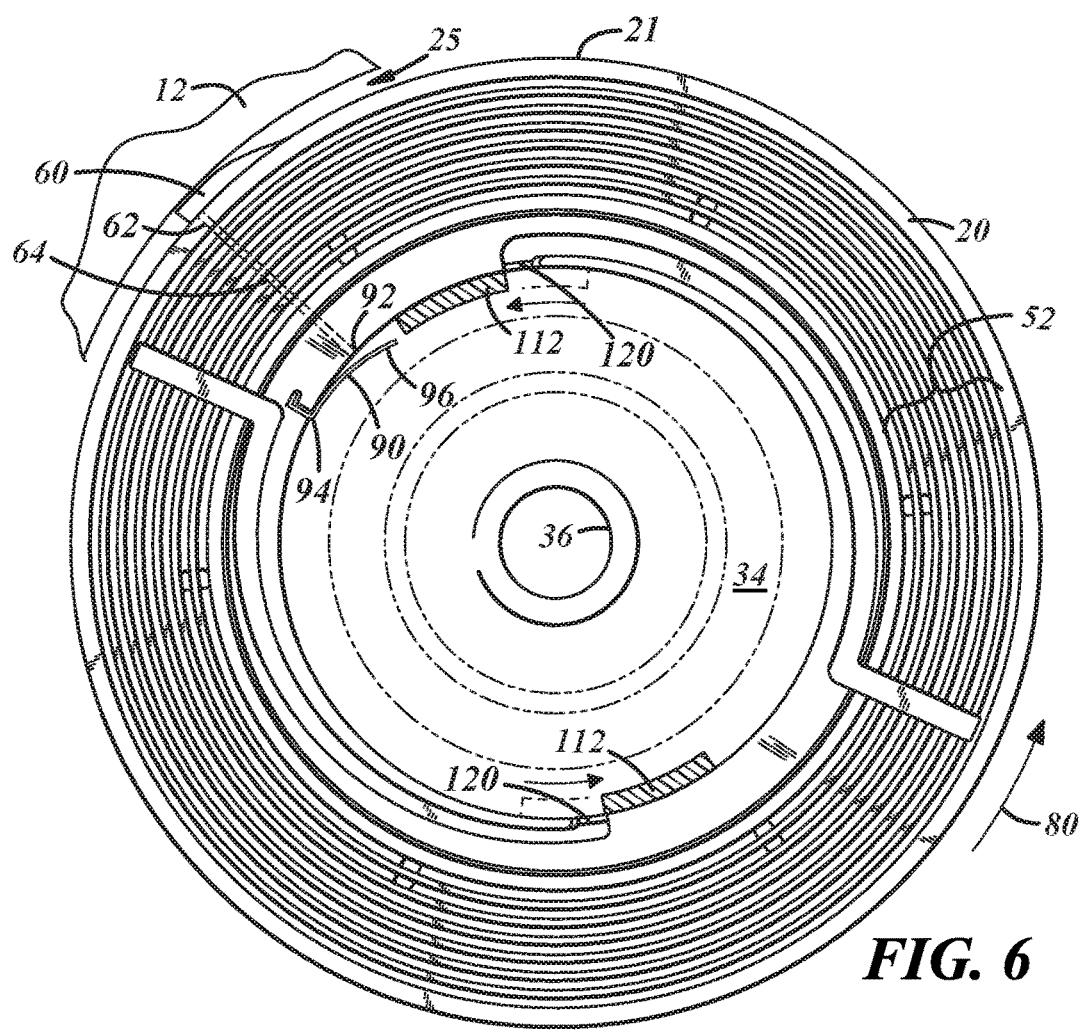

The direction of rotation of the clutch disk member 20 in the fan drive is shown by arrow 80 in FIGS. 5 and 6. This allows the wiper member 60 to more efficiently scavenge the viscous fluid and pump it into the scavenge passageway 64.

As described, the invention utilizes a high speed wiper member 60 which is mounted on the outer circumferential surface of the clutch disk member. This provides maximum scavenge at all times. Typical known wiper systems utilize slow speed wiper members. The wiper member 60 also passes fluid directly back to the fluid reservoir 32 through a passageway 64 in the clutch disk member. This brings the fluid back through the center of the clutch disk member eliminating extra parts and manufacturing processes.

A cantilevered "flap-type" valve member 90 is positioned on the clutch disk member 20 at the exit port 92 of the scavenge passageway 64, as shown in FIGS. 5 and 6. The valve member 90 is fixed at one end 94 and is free at the other end 96. When the fluid reservoir 32 is full of viscous fluid, or has a substantial quantity of viscous fluid in it, the fluid will force the valve member 90 tightly against the exit port 92. This is shown in FIG. 5. This prevents the viscous fluid from reentering the scavenge passageway in the reverse direction and returning to the working chamber. When there is an insufficient amount of fluid in the fluid chamber, pressure of the viscous fluid being scavenged from the working chamber and being pumped radially inwardly through passageway 64 will open the valve member 90 and allow fluid to pass freely into the fluid reservoir chamber 32. This is shown in FIG. 6.

Another valve member 100 is positioned in the fluid reservoir 32 and is utilized to control the amount of viscous fluid which is allowed to flow from the fluid reservoir 32 to the working chamber 50. Viscous valve mechanisms for this purpose are known in the art and conventional valve activation mechanisms could be utilized with the invention. Exemplary mechanisms can be activated by an electromagnetic system or a bimetal system, or other activation systems known today.

Figure 7:
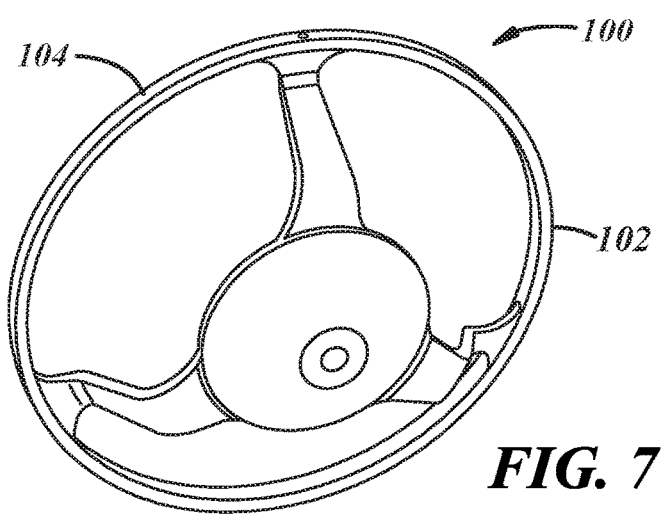
FIGS. 7 and 8 depict two embodiments of valve members which can be utilized with the present invention.
Figure 8:
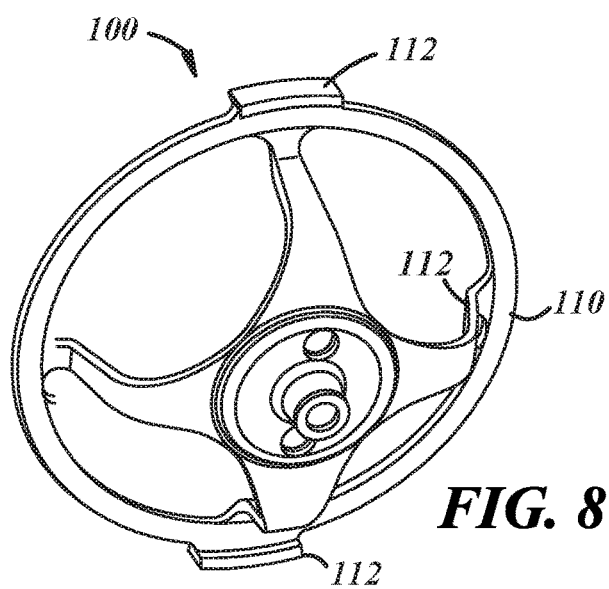

The valve member 100 could be, for example, either of the valve members 102 or 110 shown in FIGS. 7 and 8, respectively. The valve mechanism 102 has an annular cylindrical flange member 104, while the valve mechanism 110 has a plurality of partial annular flange members 112, which are used to open and close fluid openings 120 in the clutch disk member 20. The openings are connected to the fluid labyrinths in the working chamber 50 as shown in FIGS. 5 and 6.

Depending on the valve activation mechanism or system utilized, the valve member 100 can be moved axially or rotationally in order to open and close the fluid openings 120. This is discussed in more detail below. As an example, as shown in FIG. 5, partial annular flange member 112 can be rotated in the direction of arrow 115 to open and close the fluid openings 120. In FIG. 5, the fluid openings are closed, while in FIG. 6, the fluid openings are open.

Figure 9:
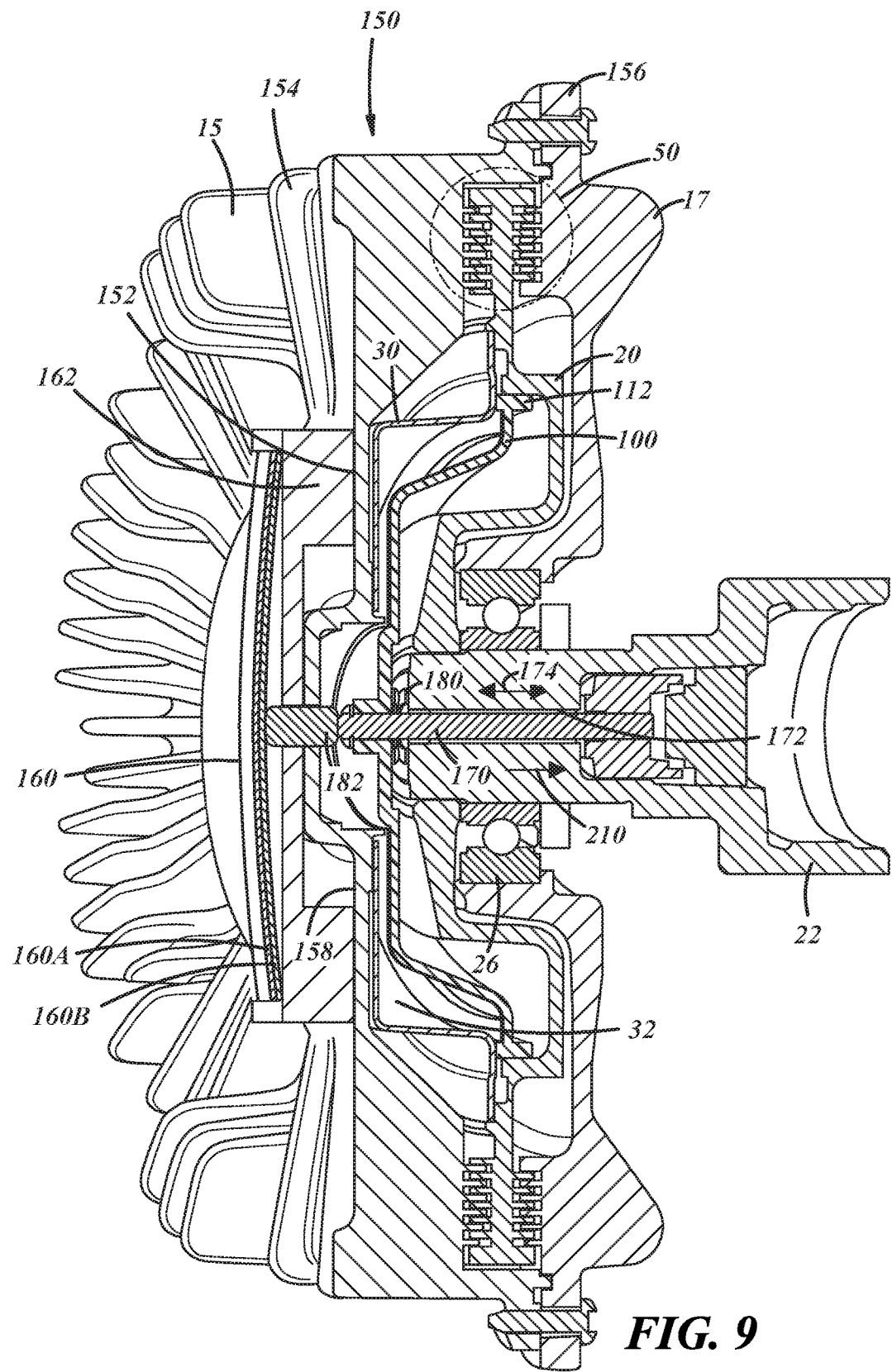
FIGS. 9 and 10 depict two different embodiments of valve activation systems which can be utilized with the present invention.
Figure 10:
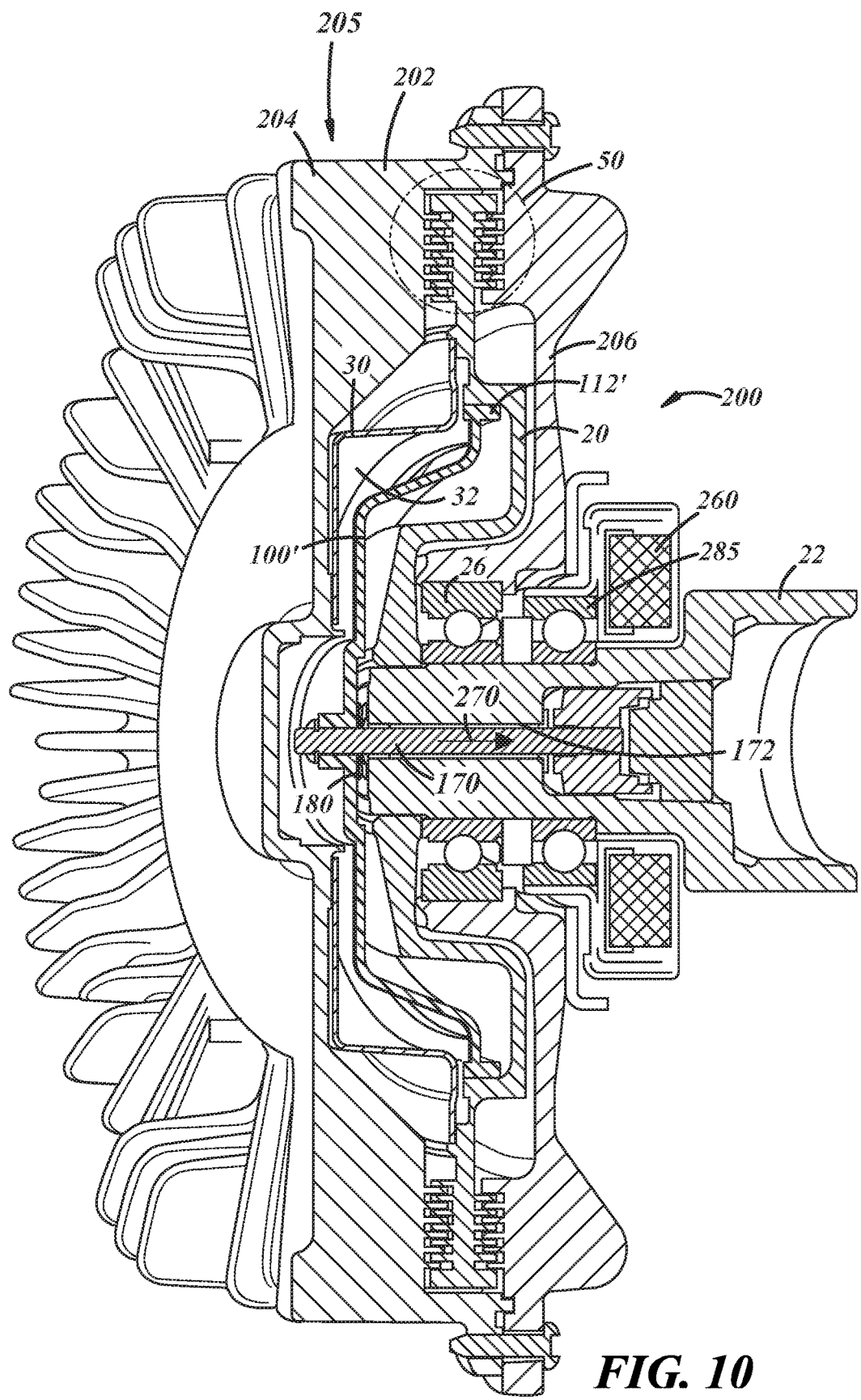

As indicated, the unique wiper and scavenge system can be used in various viscous clutches in which valve members, such as valve member 100, can be activated in different ways. As examples, the valve member 100 can be activated by a bimetal coil member 130, as shown in FIGS. 1-3, a bimetal strip member 160, as shown in FIG. 9, or an electromagnetic mechanism 200, as shown in FIG. 10.

Figure 2:
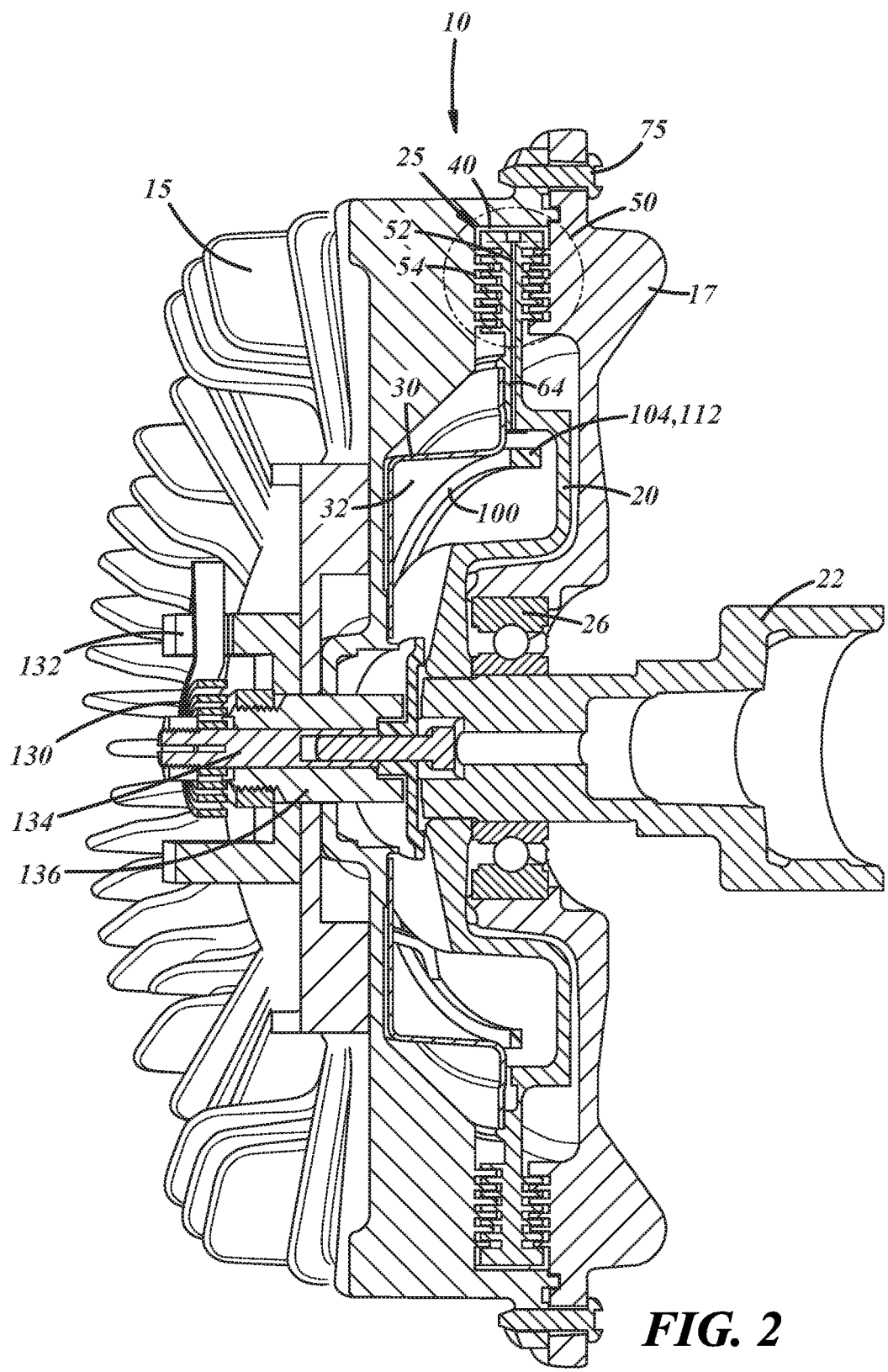
FIG. 2 is a schematic cross-sectional view of the viscous fluid drive of FIG. 1.

In the bimetal activation system depicted in FIGS. 1-3, the bimetal coil member 130 is positioned in mounting member 132. The bimetal coil member is connected to rod member 134 which is rotatably positioned in housing 136. The rod member 134 is fixedly attached to valve member 100. In this embodiment, when the bimetallic coil member 130 heats up and contracts in size, it rotates and causes rotation of rod member 134 and valve member 100.

The bimetal coil member contains two metal materials with different coefficients of expansion. When the bimetal coil member is heated, the coil contracts and rotates. The higher the temperature, the more the coil contracts and rotates. In general, the amount of rotation of a coil-type bimetal member depends on the types of metal materials, the size of the coils forming the coil member, and the size of the coil itself.

Bimetallic members have been used to convert temperature changes into mechanical displacements. Bimetal members consist of two strips of different metals which expand at different rates as they are heated. The two different materials are typically steel and copper, or steel and brass. The two metal materials are joined together throughout their length, such as by riveting, brazing or welding. The different expansions of the two materials force the strip to expand or bend one way if heated. If the bimetal member is a strip, then the metal with the higher coefficient of thermal expansion is on the outer side of the curve when the strip is heated.

A bimetallic coil member essentially is a flat bimetallic strip member that is formed into a coil shape. It consists of two layers of metal material with different rates of thermal expansion and contracts radially, rather than bending one way or the other.

With the embodiment shown in FIGS. 1-6, a bimetal actuated viscous clutch fan drive is provided with a fluid reservoir that rotates at input speed ("high") speed. The high speed fluid reservoir improves engagement response of the fan, especially at low fan speeds. Reducing the fan speed when the fan drive is disengaged results in lower parasitic losses. This in turn can improve fuel economy for the engine and vehicle.

The rotation of the valve member caused by the rotation of the bimetal coil causes the flange members 112 to open the fluid openings 120 and allow fluid to pass into the working chamber. When the bimetal coil member 130 and valve member 100 are at their "rest" position, little or no fluid can enter the working chamber. The degree of coverage of fluid openings 120 by the flange members 112 determines the amount of fluid that can pass into the working chamber and thus regulates the speed of rotation of the cooling fan 70. The speed of the fan can range from little or no rotation to full rotation, and infinitely in between.

FIG. 9 depicts another embodiment 150 of the invention. This embodiment is similar to the embodiment of FIGS. 1-6 in that both utilize a bimetal member to activate a viscous fluid valve member and both have a viscous fluid reservoir that rotates at high (input) speed. Thus, both embodiments have similar benefits and advantages.

The FIG. 9 embodiment is different from the FIG. 1-6 embodiment in that fan drive 150 includes a different bimetallic member and a valve member which is activated in a different manner by a bimetal mechanism. Other features of the viscous clutch fan drive which are common to these described above relate to FIGS. 1-6 are indicated by similar reference numbers.

The housing 152 includes a cover member 154 and a body member 156. A bimetal strip member 160 is attached to the outer surface 158 of the housing 152. The bimetal strip member is attached to mounting member 162 which positions the strip member a short distance from the housing. The mounting member is fixedly secured to the housing.

The cover member 154 has a plurality of fin members 15 on the external surface. Similar fin members 17 are positioned on the external surface of the body member 156. As indicated above, the fin members assist in dissipated heat from the viscous clutch. A fan member (not shown) is attached to the housing similar to that described above with reference to FIGS. 1-6.

The bimetal strip member includes two layers 160A and 160B of two different metal materials, each with different coefficients of expansion. Layer 160B has a higher coefficient of expansion and expands more than the layer 160A. When heated, the bimetal strip member 160 curves downwardly toward the outer surface 158 of the housing member.

Valve member 100 is positioned in the interior of the housing 152 and in the fluid reservoir. The valve member is attached to a rod member 170 which is slidingly positioned in shaft member 22. The rod member 170 is positioned in a central bore or passageway 172 and slides inside the shaft member 22 (see arrow 174).

When the rod member 170 is moved in the directions indicated by arrow 210, the valve member 100 and flange member 112 move in the same directions. The movement of the valve member 100 opens and closes fluid ports 120 in the clutch disk member 20 which regulate the passage of viscous fluid to the working chamber 50. This is similar to the manner in which movement of the valve member 100 in the embodiment of FIGS. 1-6 opens and closes the fluid passageways, except the movement of the valve member 100 is rotary in FIGS. 1-6, while the movement of the valve member 100 in FIG. 9 is axial.

Like the fan drive discussed above, the shaft member 22 is attached to a pulley member and rotates at input speed. The clutch disk member 20 is attached to the shaft member 22 and rotates at the same speed. Similarly, the fluid reservoir 32 which is connected to the clutch disk member 20 by fluid chamber cover 30 rotates with the clutch disk at input speed.

Similar to the viscous clutch embodiment described above, the working chamber 50 includes labyrinths on the outer portion of the clutch disk member 20 and mating labyrinths in the housing member. A wiper member 60 positioned on the outer circumferential surface 21 of the clutch disk member 20 directs the viscous fluid from the working chamber into scavenge channel or passageway 64. This is the same as the wiping and scavenge system discussed above with reference to FIGS. 1-6.

The scavenged viscous fluid is directed into the viscous fluid reservoir chamber 32 formed by reservoir cover member 30 which is positioned against the clutch disk member 20 and rotates at the same speed.

The rod member 170 is biased by spring member 180 in an axial direction toward the bimetal strip member 160. The top end or head 182 of the rod member 170 is positioned in contact with the bimetal strip member 160, or a small distance from it. At this initial or "rest" position, the viscous fluid passageways to the working chamber are closed, and there is little viscous fluid in the working chamber.

Upon bending of the bimetal strip member 160 in a direction toward the outer surface 158 of the housing, the strip member 160 contacts the rod member 170 and forces it in an axial direction toward the pulley member. This in turn moves the valve member 100 in an axial direction and opens the passageways (or ports) 120 from the reservoir chamber 40 into the working chamber 50. The more the bimetal strip member bends, the more the passageways 120 are opened, and the faster the fan member is rotated. As with the embodiment discussed above, the speed of the fan member can be changed infinitely from zero to full speed, depending on the heat being applied to the bimetal strip member and the resultant amount of bending.

Another embodiment of a viscous fluid fan drive which can be utilized with a wiper member and scavenge system in accordance with the present invention is shown in FIG. 10 and indicated by reference numeral 200. The fan drive assembly 205 includes a housing 202 which comprises a cover member 204 and a body member 206. A clutch disk member 20 is positioned inside the housing and is secured to shaft member 22. Both the shaft member 22 and clutch disk member rotate at input speed.

A fan member similar to fan member 70 discussed above, is fixedly secured to the housing. The body member 206 is positioned on the shaft member by a bearing member 26. The housing (comprised of the cover member and body member) rotates at fan speed.

Working chamber 50 consisting of at least one set of mating labyrinths is the same as working chamber 50 discussed above. Viscous fluid is introduced into the working chamber, causing the housing and fan member to rotate.

A fluid chamber cover 30 is positioned on the clutch disk member 20 forming a fluid reservoir 32.

A wiper member is positioned on the perimeter of the clutch disk member. The wiper member is the same as wiper member 60 discussed above and depicted in the drawings, especially FIGS. 3-4. In addition, a scavenge opening passageway and exit port are provided in the clutch disk member 20 the same as the scavenge port 62, scavenge passageway 64 and exit port 92 discussed above and depicted in the drawings. With this arrangement, fluid scavenged from the working chamber is pumped into the fluid reservoir 32. Preferably, a cantilevered flap-type valve member is provided on the clutch disk member the same as valve member 90 discussed above and depicted in FIGS. 5 and 6.

Valve member 100' is provided in the fluid reservoir and is the same as, or similar to, the valve member 100 discussed above. A plurality of flange members 112' are positioned on the valve member 100' and are the same as and perform the same function as flange members 112 discussed above. The flange members 112' are utilized to open and close the fluid openings from the fluid reservoir to the working chamber 50.

With the embodiment shown in FIG. 10, the valve member 100 is activated by an electromagnetic system rather than a bimetal system. An electromagnetic coil member 260 is utilized to move pin member 170 axially in the direction of arrow 270. The pin member 170 is positioned in central bore member 172 in the shaft member 22.

The electromagnetic coil is positioned on the shaft member 22 by bearing 285 and electrically energized in a conventional manner through a contact or lead (not shown).

In this embodiment, the electromagnetic coil is energized when it is desired to rotate the fan member and cool the engine and/or engine coolant. Movement of the pin member 170 in the direction of arrow 270 results in a similar axial movement of the valve member 100' and the flange member 112'. This opens the passageways to the working chamber and allows viscous fluid to enter the labyrinth and cause the housing and fan member to rotate. The amount of axial movement of the pin members, valve members and flange members controls the speed of the cooling fan. This is controlled by the engine computerized module. Thus, the speed of the fan can be controlled from zero to full speed and any speed in-between.

A spring member 180 positioned between the valve member 100' and a shoulder on the shaft member 22 maintains the valve member in its rest position, and also returns the valve member to that position when the electromagnetic coil is not energized.

Although the invention has been described with respect to preferred embodiments, it is to be also understood that it is not to be so limited since changes and modifications can be made therein which are within the full scope of this invention as detailed by the following claims.

What is claimed is:

1. A viscous clutch drive comprising:
   a clutch disk that is rotatable about a rotary axis, the clutch disk having a disk member with an outer circumferential end, the disk member having a plurality of first channels, which are disposed concentrically about the rotary axis, a scavenge passage, and a supply passageway that intersects the first channels, the scavenge passage extending radially through the clutch disk and intersecting the outer circumferential end;
   a housing that defines a cavity and a plurality of second channels, the clutch disk being received in the cavity and being rotatable relative to the housing, the housing being an output member of the viscous clutch drive and cooperating with the clutch disk to define a working chamber in which the first and second channels are disposed;
   a reservoir cover coupled to the disk member for common rotation about the rotary axis, the reservoir cover cooperating with the disk member to define a reservoir and a supply conduit that fluidly couples the reservoir to the supply passageway, the scavenge passage of the clutch disk having a radially inward end that intersects the reservoir;
   a wiper coupled to the clutch disk for rotation therewith, the wiper being positioned on the outer circumferential end proximate a radially outer end of the scavenge passage;
   a valve member received between the reservoir cover and the disk member, the valve member having a valve element that is movable relative to the clutch disk between a first position, in which the valve element engages the disk member and the reservoir cover to close the supply conduit to thereby inhibit fluid flow from the reservoir and the supply passageway, and a second position that permits fluid flow from the reservoir to the supply passageway; and
   a bimetal actuator coupled to the housing, the bimetal actuator having an output member that is coupled to the valve element for common movement.

2. The viscous clutch drive of claim 1, wherein the wiper defines a recess that is disposed about the radially outer end of the scavenge passage.

3. The viscous clutch drive of claim 2, wherein the recess is disposed concentrically about the radially outer end of the scavenge passage.

4. The viscous clutch drive of claim 1, wherein the bimetal actuator comprises a helically coiled bimetal strip that is rotatably coupled to the output member.

5. The viscous clutch drive of claim 4, wherein the output member of the bimetal actuator is a shaft having an end that is fixed to an end of the helically coiled bimetal strip and wherein the valve element is coupled to the shaft for rotation therewith.

6. The viscous clutch drive of claim 5, wherein the shaft is rotatable about the rotary axis.

7. The viscous clutch drive of claim 1, wherein the output member of the bimetal actuator is a shaft that is translatable along the rotary axis.

8. The viscous clutch drive of claim 1, wherein the valve member comprises an inner annular body, an outer annular body and a plurality of web members that couple the inner annular body to the outer annular body.

9. The viscous clutch drive of claim 8, wherein the valve element is fixedly coupled to the outer annular body.

10. The viscous clutch drive of claim 8, wherein the inner annular body and the outer annular body are spaced apart from one another along the rotary axis.

11. The viscous clutch drive of claim 10, further comprising:
    a shaft that is coupled to the clutch disk for common rotation, and
    a bearing received between the shaft and the housing;
    wherein the disk member comprises a first annular portion, a second annular portion that is offset from the first annular portion along the rotary axis, and a connecting portion that fixedly couples the first and second annular portions to one another, and wherein the bearing is disposed radially inward of the connecting portion axially between the first and second annular portions.

12. The viscous clutch drive of claim 1, further comprising a fan coupled to the housing for rotation therewith.

13. A viscous clutch drive comprising:
    a clutch disk that is rotatable about a rotary axis, the clutch disk having a disk member with an outer circumferential end, the disk member having a plurality of first channels, which are disposed concentrically about the rotary axis, a scavenge passage, and a supply passageway that intersects the first channels, the scavenge passage extending radially through the clutch disk and intersecting the outer circumferential end;
    a housing that defines a cavity and a plurality of second channels, the clutch disk being received in the cavity and being rotatable relative to the housing, the housing being an output member of the viscous clutch drive and cooperating with the clutch disk to define a working chamber in which the first and second channels are disposed;
    a reservoir cover coupled to the disk member for common rotation about the rotary axis, the reservoir cover cooperating with the disk member to define a reservoir and a supply conduit that fluidly couples the reservoir to the supply passageway, the scavenge passage of the clutch disk having a radially inward end that intersects the reservoir;
    a wiper coupled to the clutch disk for rotation therewith, the wiper being positioned on the outer circumferential end proximate a radially outer end of the scavenge passage;

a valve member received between the reservoir cover and the disk member, the valve member having a valve element that is movable relative to the clutch disk between a first position, in which the valve element closes the supply conduit in the clutch disk to thereby inhibit fluid flow from the reservoir and the supply passageway, and a second position that permits fluid flow from the reservoir to the supply passageway; and a bimetal actuator coupled to the housing, the bimetal actuator having an output member that is coupled to the valve element for common movement.

14. The viscous clutch drive of claim 13, wherein the wiper defines a recess that is disposed about the radially outer end of the scavenge passage.

15. The viscous clutch drive of claim 14, wherein the recess is disposed concentrically about the radially outer end of the scavenge passage.

16. The viscous clutch drive of claim 13, wherein the bimetal actuator comprises a helically coiled bimetal strip that is rotatably coupled to the output member.

17. The viscous clutch drive of claim 16, wherein the output member of the bimetal actuator is a shaft having an end that is fixed to an end of the helically coiled bimetal strip and wherein the valve element is coupled to the shaft for rotation therewith.

18. The viscous clutch drive of claim 17, wherein the shaft is rotatable about the rotary axis.

19. The viscous clutch drive of claim 13, wherein the output member of the bimetal actuator is a shaft that is translatable along the rotary axis.

20. The viscous clutch drive of claim 13, wherein the valve member comprises an inner annular body, an outer annular body and a plurality of web members that couple the inner annular body to the outer annular body.

21. The viscous clutch drive of claim 20, wherein the valve element is fixedly coupled to the outer annular body.

22. The viscous clutch drive of claim 20, wherein the inner annular body and the outer annular body are spaced apart from one another along the rotary axis.

23. The viscous clutch drive of claim 22, further comprising:

a shaft that is coupled to the clutch disk for common rotation, and a bearing received between the shaft and the housing;

wherein the disk member comprises a first annular portion, a second annular portion that is offset from the first annular portion along the rotary axis, and a connecting portion that fixedly couples the first and second annular portions to one another, and wherein the bearing is disposed radially inward of the connecting portion axially between the first and second annular portions.

24. The viscous clutch drive of claim 13, further comprising a fan coupled to the housing for rotation therewith.

* * * * *